Dec. 25, 1951  J. W. HUTCHINS  2,579,825
ANALYZER
Filed July 5, 1949  2 SHEETS—SHEET 1

FIG. I

INVENTOR.
J. W. HUTCHINS
BY Hudson & Young
by L. Malcolm Oberlin
ATTORNEYS

Dec. 25, 1951 J. W. HUTCHINS 2,579,825
ANALYZER
Filed July 5, 1949 2 SHEETS—SHEET 2

INVENTOR.
J. W. HUTCHINS
BY Hudson & Young
by: L. Malcolm Oberlin
ATTORNEYS

Patented Dec. 25, 1951

2,579,825

UNITED STATES PATENT OFFICE 2,579,825

ANALYZER

Joseph W. Hutchins, Bartlesville, Okla., assignor to Phillips Petroleum Company, a corporation of Delaware Application July 5, 1949, Serial No. 103,158

11 Claims. (Cl. 250—43)

This invention relates to a method of and apparatus for measuring the absorption characteristics of a fluid. In another aspect, it relates to a Wheatstone bridge circuit for use in an analyzer. In still another aspect, it relates to a device for maintaining a constant pressure in a cell or chamber to which the gas to be analyzed is passed.

Recording infra-red gas analyzers have been devised which automatically measure the absorption of infra-red radiation by various organic mixtures. Such analyzers are of particular value in the petroleum and chemical industries for recording and control purposes wherein a continuous analysis of a component of a gaseous stream is required.

Difficulties have been encountered with commercially available analyzers in that there is a definite and noticeable drift in the apparatus. Thus, variations in temperature of the ambient air, aging of circuit components, fogging of the windows by which the radiation is admitted to the sample all produce changes in the recorded analysis independently of variations in the composition of the stream under test.

It is an object of this invention to provide an analyzing device in which certain factors producing drift are eliminated and in which periodic adjustments are automatically made to compensate for the effect of factors causing drift.

It is a further object to provide a balanced Wheatstone bridge circuit which is periodically and automatically calibrated to compensate for effects produced by variations in ambient temperature and other factors.

It is a still further object to provide a device for maintaining a constant pressure in the sample cell through which the liquid to be tested is passed.

It is a further object to provide apparatus which is rugged, durable, economical to manufacture, and which is extremely reliable in operation.

Figure 1:
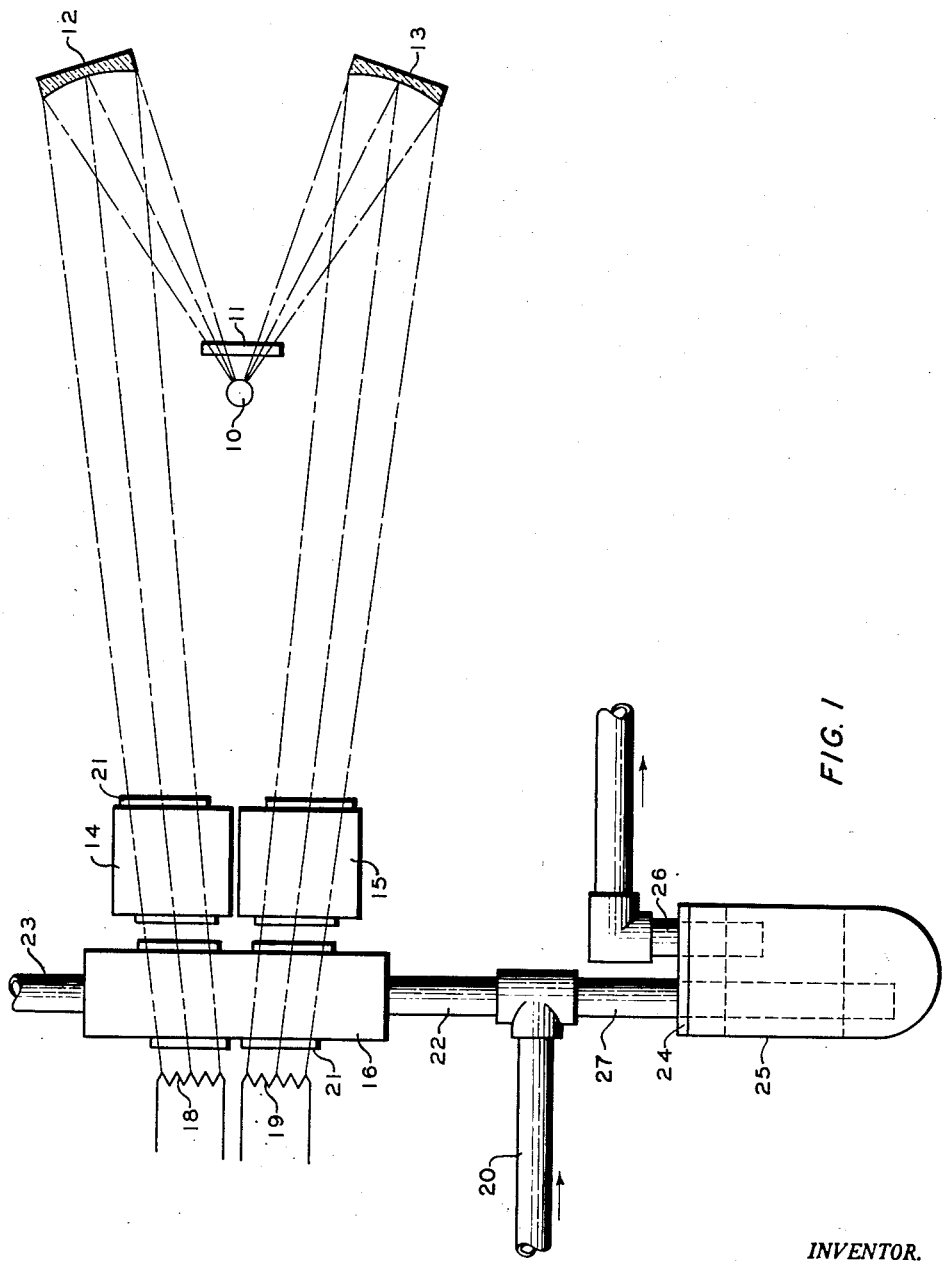
Figure 2:
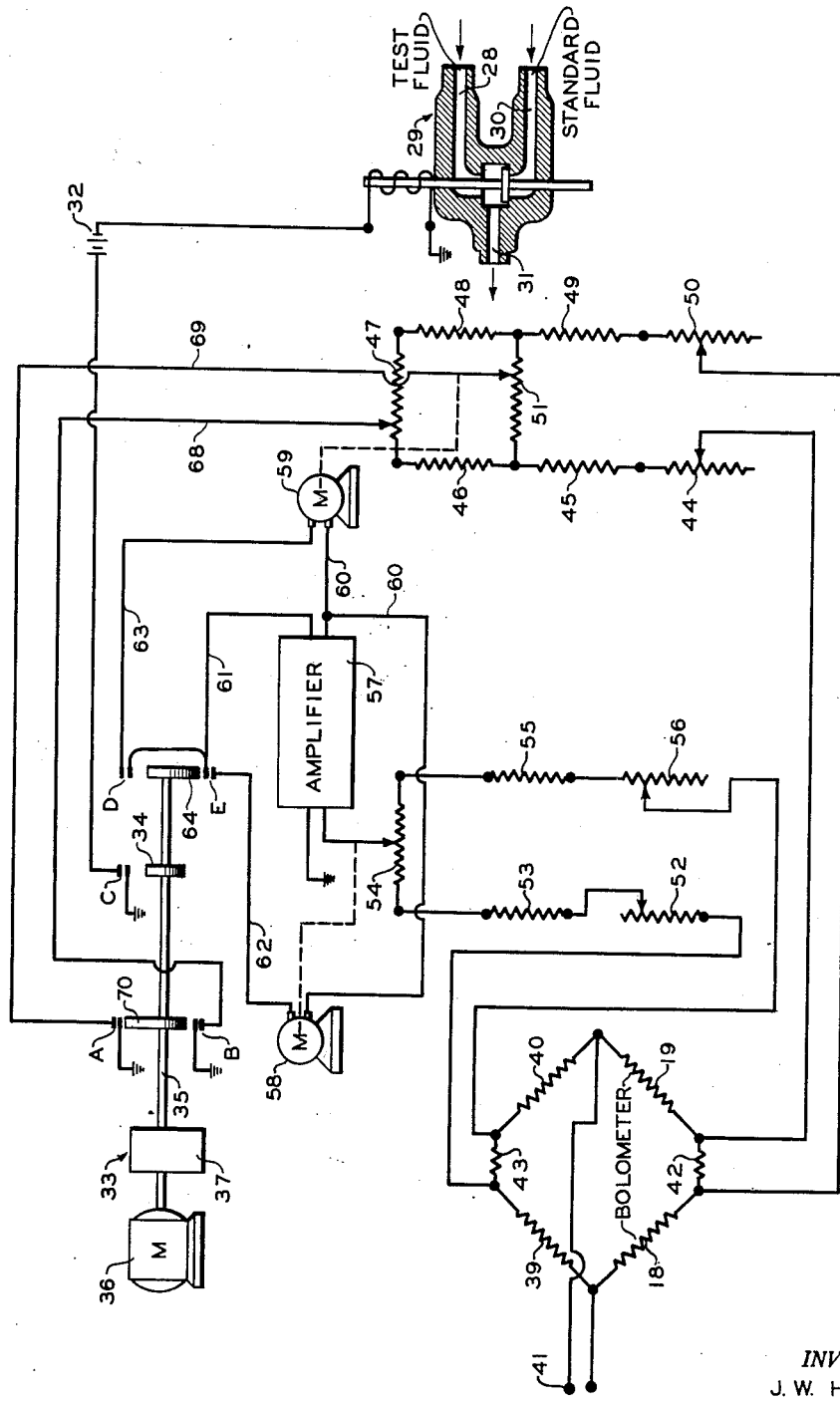

Various other objects, advantages and features of the invention will become apparent from the accompanying drawings, in which:

Figure 1 is a schematic view of the optical system of the analyzer showing the pressure-regulating device; and Figure 2 is a schematic circuit diagram of the bridge circuit.

Referring now to the drawings in detail, and particularly to Figure 1, I have shown a source 10 of infra-red or other suitable radiation from which two beams are directed through a window 11 against a pair of front surface concave mirrors 12 and 13. The respective beams of radiation are reflected by the mirrors and thence pass through a pair of cells 14, 15 and a cell 16 to a pair of radiation-sensitive devices 18 and 19, such as bolometers, thermocouples, or thermisters. The cells are provided with windows 21 which are transparent to the radiation used. In the case of infra-red radiation, the windows may be formed from a halide, such as silver chloride, calcium fluoride, sodium fluoride, or from quartz. Preferably, cell 14, which may be formed from Pyrex glass, spinel, or quartz, is filled with a pure material or mixture of materials having a principal absorption band at the same frequency as the principal absorption band of the material or component to be measured in the test stream while cell 15 contains air or other substance transparent to the radiation. The fluid under test is admitted to sample cell 16 by a conduit 22 and leaves the cell through an outlet 23.

The beams of radiation incident upon the bolometers 18, 19 produce temperature changes therein which, in turn, vary the electrical resistances of the bolometers. With the apparatus arranged as described, the differential in resistance between the bolometers indicates the amount or percentage of the desired pure material or component found in the mixture in the sample cell provided said pure material or component has a principal absorption band at the same frequency as the fluid in cell 14. This apparatus for producing an impedance differential between two elements which is proportional to the percentage of the component to be tested for is well known in the art and forms no part of the present invention. It is within the scope of the invention to utilize other types of radiation, such as monochromatic light or ultraviolet radiation, so long as an impedance change is produced in the radiation-sensitive devices by variations in the composition of the test sample.

It has been found that improved results are obtained with the present apparatus when the fluid, such as a hydrocarbon gas, is admitted to the sample cell 16 at constant pressure. To this end, conduit 22 which is supplied by conduit 20 communicates with one end of a branch conduit 27, the other end of which passes through a cap 24 fixed on an elongated vessel 25 which is partially filled with a liquid, such as water, mineral seal oil, mercury, or any liquid that does not readily evaporate. A second conduit 26 extends into the vessel through cap 24, the lower end of conduit 26 communicating with an air space above the liquid level and the lower end of conduit 23 being submerged below the liquid level. When the pressure in conduit 22 exceeds the desired value, a portion of fluid bubbles through the liquid in vessel 25 and passes out of the vessel through conduit 26 to restore the pressure in conduit 22 to its predetermined value. The depth of liquid in the vessel 25 controls the constant pressure maintained in conduit 22 and in the sample cell 16.

It has been found that inaccuracies in the absorption measurement occur as a result of temperature changes, aging of circuit components, and other factors. In accordance with the invention, I periodically calibrate the electrical apparatus to compensate for the effect of such factors. To this end, I provide means for periodically admitting a standard fluid to test cell 16 to produce a standard reading by which the circuit is automatically adjusted to compensate for factors causing drift. Referring to Figure 2, test fluid is admitted to a conduit 28 of a solenoid operated valve 29 and a source of standard fluid is connected to a conduit 30 of the solenoid operated valve. The outlet conduit 31 of the valve is suitably connected to conduit 22, Figure 1, and this conduit may be provided with suitable heat exchange apparatus so that the sample enters the system at constant temperature. The coil of solenoid operated valve 29 is connected in circuit with a source of current 32, and a set of contacts C of a cam operated switch 33. The contacts C are actuated by a cam 34 fixed on a shaft 35 which is driven by a motor 36 through reduction gearing 37.

The bolometers 18, 19 are connected in a Wheatstone bridge circuit with balancing resistors 39 and 40. A source 41 of alternating current has one terminal thereof connected to the junction between units 19 and 40, the other terminal of the source being connected to the junction between units 18 and 39. A series resistor 42 is connected between bolometers 18, 19 and a series resistor 43 is connected between resistances 39 and 40. Resistor 42 is shunted by a unit including a variable resistor 44, a fixed resistor 45, a fixed resistor 46, a potentiometer 47, a fixed resistor 48, a fixed resistor 49, and a variable resistor 50, all connected in series. A potentiometer 51 has one terminal thereof connected to the junction between resistances 45, 46 and its other terminal connected to the junction between resistors 48 and 49. The resistor 43 is shunted by a unit including a variable resistor 52, a fixed resistor 53, a potentiometer 54, a fixed resistor 55, and a variable resistor 56, all connected in series. When resistances 44 and 50 are used, resistors 45 and 49, 46 and 48, may be eliminated and, in some cases, it is also possible to eliminate resistors 53 and 55.

When an alternating current potential is supplied to the bridge by source 41, potentiometers 47 and 54 may be adjusted so that there is a zero potential difference therebetween and, similarly, potentiometers 51, 54 may be adjusted so that there is a zero potential difference therebetween. The bridge is then balanced insofar as the contact arms of these potentiometers are concerned. Variable resistors 52, 56 are connected to a common control shaft in such fashion that rotation of the shaft increases the ohmic value of one of said resistors and decreases the ohmic value of the other variable resistance. Thus, these ganged resistors may be used as an auxiliary bridge balancing control since rotation of the shaft increases the resistance on one side of potentiometer 54 and decreases the resistance on the other side of potentiometer 54. Variable resistors 44, 50 are also connected to a common control shaft. Adjustment of this shaft, however, either increases or decreases the ohmic value of both resistors simultaneously. This control permits adjustment of the sensitivity of the bridge circuit. Thus, when the resistance of the units 44, 50 is high, full scale movement of potentiometer 47 or 51 produces only a small variation in the balance point of the bridge due to the relatively large series resistance in circuit therewith. When the resistance of units 44, 50 is small, adjustment of potentiometers 47, 51 covers a wide range of balancing conditions since the series resistance in circuit therewith is relatively small.

The arm of potentiometer 54 is connected to one input terminal of an amplifier 57, the other input terminal of which is grounded. The output of amplifier 57 selectively energizes a pair of motors 58, 59 which are mechanically connected to the respective control shafts of potentiometers 54 and 51. To this end, one output terminal is connected by a lead 60 to one terminal of each of said motors, the other output terminal being connected to the respective contact sets D, E of cam operated switch 33 by a lead 61. One contact of set E is connected to motor 58 by a lead 62 and one contact of set D is connected to motor 59 by a lead 63. The contacts D and E are operated by a cam 64 fixed on shaft 35. Accordingly, when contacts E are closed, the output of amplifier 57 is fed to motor 58 and, when contacts D are closed, the output of the amplifier is fed to motor 59. The motor 59 and potentiometer 51 preferably constitute elements of a recording or controlling potentiometer, as will be understood by those skilled in the art. This potentiometer may be used to provide a continuous record of the analysis of the sample and, in addition, it may be used to control the process by which the sample is produced as will become apparent from the following description. Both motors 58, 59 are reversible and amplifier 57 has an output such that each motor is rotated in one direction when the signal from the bridge indicates an unbalance on one side and it is rotated in the opposite direction when the bridge is unbalanced on the opposite side.

The arm of potentiometer 47 is connected by a lead 68 to a contact B of switch 33 and the arm of potentiometer 51 is connected by a lead 69 to a contact A of switch 33, one contact of each set A and B being grounded and thereby connected to one input terminal of amplifier 57. The contacts A and B are actuated by a cam 70 fixed on shaft 35.

In the operation of the circuit of Figure 2, a standard fluid of known composition is admitted to sample cell 16, it being desired to measure the percentage of one component of said sample in a process stream. Potentiometer 54 is set to the middle of its scale. By means of the bridge balance obtained by adjustment of potentiometers 52 and 56, potentiometer 51 is set to a position corresponding to the known percentage of the test component in the sample cell by motor 59, it being understood that contacts A are closed and contacts B are opened during this period so that the input fed to the amplifier 57 is the voltage appearing between the arm of potentiometer 54 and the arm of potentiometer 51. The cam shaft is then turned so that contact A is open, contact B is closed, contact D is open, contact E is closed and contact C is closed. As soon as the standardizing sample has purged the cell, the potentiometer 47 is moved by hand until motor 58 drives the potentiometer 54 to its mid-scale position, or to the same position at which the potentiometer 54 was set when the test component was in the cell.

A sample from the process stream is then passed through conduit 28, conduit 31, and conduit 22, Figure 1, to the sample cell 16 with contacts A, D closed, and contacts B, C, E open. If the percentage of the component of interest is different in the process sample than in the test sample, the impedance of the bolometers 18, 19 will be changed with resultant unbalance of the bridge circuit. This unbalance voltage appearing between the arms of potentiometers 51, 54 is fed through amplifier 57 with the result that motor 59 moves potentiometer 51 to restore the bridge to a balanced condition. The movement of the arm of potentiometer 51 effected in balancing the bridge in this manner is a direct indication of the percentage variation of the component under test from that in the standard fluid. This deviation may be recorded by a pen arm actuated by the potentiometer and, if desired, this movement of the potentiometer may actuate control equipment in a well understood manner to change a process variable and bring the composition of the process stream to a desired analysis.

In accordance with the invention, standard liquid is periodically fed to the test cell and the setting of potentiometer 54 is changed to compensate for resistance variations due to temperature changes, aging, and other factors. When standard fluid is fed through the cell in this manner, the input terminals of amplifier 57 are connected to the arms of potentiometers 47, 54 and the output terminals are connected to motor 58. Normally, the bridge should be balanced, since this is the original condition for which a balance was obtained. However, should the bridge be unbalanced, due to temperature changes, aging or other factors, the unbalance voltage is fed through amplifier 57 with the result that motor 58 moves potentiometer 54 to restore the bridge to a balanced condition. Thereupon, the amplifier input terminals are again connected to the arms of potentiometers 54 and 51, the sample being analyzed is again admitted to the sample cell, and the output of the amplifier connected to motor 59, thus initiating a new cycle of operation.

It is a feature of the invention that this calibration operation is carried out automatically by the use of cam switch 33. This switch closes and opens the contacts A to E, inclusive, in the manner illustrated by the following table:

| Step | | A | B | C | D | E |
|---|---|---|---|---|---|---|
| 1 | Sample in | Closed | Open | Open | Closed | Open. |
| 2 | Transition | do | do | do | Open | Do. |
| 3 | do | do | do | Closed | do | Do. |
| 4 | do | Open | Closed | do | do | Do. |
| 5 | Standardization | do | do | do | do | Closed. |
| 6 | Transition | do | do | do | do | Open |
| 7 | do | Closed | Open | do | do | Do. |
| 8 | do | do | do | Open | do | Do. |
| 9 | Sample in | do | do | do | Closed | Do. |

In position 1, the process fluid flows into the sample cell through conduit 28, the contact C being open so that solenoid operated valve 29 is de-energized. Contacts A are closed and contacts B are opened so that the amplifier input is the voltage between the arms of potentiometers 51 and 54. Contacts D are closed and contacts E are open with the result that the amplifier output is fed to motor 59 which drives potentiometer 51. As a result, the arm of potentiometer 51 is moved in accordance with changes in composition of the process fluid, the potentiometer reading indicating the percentage of a particular pure substance or component in the process fluid. In position 2, transition to the standardizing or calibrating stage is initiated, the contacts D being opened to disconnect motor 59 from the output of amplifier 57. In position 3, contacts C are closed to actuate solenoid valve 27, thus stopping the flow of process liquid to the sample cell through conduit 28 and initiating flow of standard liquid to the sample cell through conduit 30. In position 4, contacts A are opened and contacts B are closed so that the amplifier input is the voltage between the arms of potentiometers 47, 54 rather than the voltage between the arms of potentiometers 51 and 54. In position 5, the standardization operation takes place, the contacts E being closed to connect motor 58 to the amplifier output. As a result, potentiometer 54 is adjusted to balance the bridge and thereby compensate for change in the circuit components produced by temperature variations and other factors.

In position 6, transition back to the sample analyzing stage is initiated by opening the contacts E to disconnect motor 58 from the output of amplifier 57. In position 7, contacts A are closed and contacts B are opened to connect the arm of potentiometer 51 to the amplifier input and disconnect the arm of potentiometer 47 therefrom. In position 8, contacts C are opened to de-energize solenoid valve 29, thus stopping the flow of standard fluid to the test cell through conduit 30 and initiating the flow of process fluid to the cell through conduit 28. In position 9, contacts D are closed to connect motor 59 to the output terminals of amplifier 57 so that potentiometer 51 again indicates the composition of the process stream. This position is identical with position 1 and initiates a new cycle of operation.

It will be apparent that I have provided a balancing circuit which is periodically calibrated, in an automatic manner, to compensate for drift caused by temperature changes and other factors. The standarization cycle preferably occupies about five minutes of each hour of operation and does not interfere with proper recording of the stream analysis or with control of the process thereby. The pin remains in its last position during the standardizing process and is dead during the period when motor circuit to 59 is open. When the temperature of the air is maintained within predetermined limits by apparatus described in my copending application, Serial No. 114,157, filed September 6, 1949, entitled Recording Infrared Gas Analyzer, the accuracy and reliability of the instrument has been found to be entirely satisfactory for commercial operation.

In a circuit commercially used with standard bolometers, potentiometer 51 and motor 59 form a part of a standard recording potentiometer, and the values of the other resistances were as follows: Balancing resistors 39 and 40, 1,000 ohms; resistor 42, 0.6 ohms; resistor 43, 2.5 ohms; variable resistors 52 and 56, 15 ohms; fixed resistor 53, 27 ohms; fixed resistor 55, 39 ohms; motor driven potentiometer 54, 4 ohms; variable resistors 44 and 50, 50 ohms; fixed resistances 45 and 49, 15 ohms; fixed resistances 46 and 48, 10 ohms; and variable resistor 47, 50 ohms.

While the invention has been described in connection with a present, preferred embodiment thereof, it is to be understood that this description Having described my invention, I claim:

1. In an analyzer, a Wheatstone bridge, a pair of radiation sensitive devices disposed, respectively, in two arms of said bridge, the impedance of said devices being proportional to the intensity of radiation incident thereon, a pair of variable impedances included in the bridge circuit, and motor driven means responsive to an unbalance voltage in the bridge for alternately adjusting said variable impedances to eliminate said unbalance voltage and balance the bridge.

2. An analyzer in accordance with claim 1 in which one of said variable impedances forms a part of a recording potentiometer.

3. In an analyzer, a Wheatstone bridge, a pair of radiation sensitive devices disposed, respectively, in two arms of said bridge, the impedance of said devices being proportional to the intensity of radiation incident thereon, a pair of variable impedances connected in series with the bridge impedances at opposite corners of the bridge circuit, one of said impedances forming a part of a recording potentiometer, a motor for adjusting each of said variable impedances, an amplifier, means for selectively connecting said amplifier to said motors, and means for connecting the input circuit of said amplifier to said bridge circuit so that it is responsive to an unbalance voltage in the bridge circuit.

4. In an analyzer, a sample cell, a standard cell, a pair of bolometers, means for directing beams of infra-red radiation through the respective cells against said bolometers, a balancing resistor connected to one terminal of each bolometer, a resistance interconnecting the other terminals of said bolometers, a second resistance interconnecting said balancing resistors to form a bridge circuit, a motor-driven potentiometer shunted across said second resistance, a motor-driven potentiometer shunted across said first resistance, an amplifier, a lead connecting one input terminal of said amplifier to the arm of one motor-driven potentiometer, means for selectively connecting the other input terminal to the arm of said second motor-driven potentiometer or to a reference point on said first resistance, means for selectively connecting the amplifier output to the potentiometer motors, a solenoid operated valve for selectively passing a test fluid or a standard fluid to the sample cell, and means for operating said solenoid and said selective connecting means in timed relation to connect the amplifier output to one motor and to connect said other input terminal to said arm when said valve is in position to pass test fluid to the sample cell, and to connect said other input terminal to said reference point when said valve is in position to pass test fluid to the sample cell, said selective connecting means connecting the amplifier output to the other motor when said valve is in the last named position, so that said first motor driven potentiometer is actuated to balance the bridge circuit while test fluid is passed through the sample cell, and said second motor driven potentiometer is periodically adjusted to balance the bridge circuit while standard fluid is passed through the sample cell.

5. In an analyzer, a sample cell, a standard cell, a pair of bolometers, means for directing beams of infra-red radiation through the respective cells against said bolometers, a balancing resistor connected to one terminal of each bolometer, a resistance interconnecting the other terminals of said bolometers, a second resistance interconnecting said balancing resistors to form a bridge circuit, a unit shunted across said second resistance including a motor-driven potentiometer, a unit shunted across said first resistance including a second motor-driven potentiometer, a potentiometer connected in shunt with said second motor-driven potentiometer, an amplifier, means connecting one input terminal of said amplifier to the arm of one motor-driven potentiometer, a switch for selectively connecting the other input terminal to said second motor-driven potentiometer or to said shunt potentiometer, a switch for selectively connecting the amplifier output to the potentiometer motors, a solenoid operated valve for selectively passing a test fluid or a standard fluid to said sample cell, a third switch for actuating said solenoid, and means for operating said switches in timed relation so that said second motor-driven potentiometer is periodically adjusted to balance the bridge circuit and compensate for changes in the circuit components of the bridge resulting from temperature variations while standard fluid is passed through the sample cell, and said first motor-driven potentiometer is actuated to balance the bridge circuit while test fluid is passed through the sample cell.

6. In an analyzer, a sample cell, a standard cell, a pair of bolometers, means for directing beams of infra-red radiation through the respective cells against said bolometers, a balancing resistor connected to one terminal of each bolometer, a resistance interconnecting the other terminals of said bolometers, a second resistance interconnecting said balancing resistors to form a bridge circuit, a unit shunted across said second resistance including a variable resistor, a motor-driven potentiometer, and a second variable resistor all connected in series, said variable resistors being ganged so that rotation of their control shaft increases the ohmic value of one variable resistor and decreases the ohmic value of the other variable resistor, a unit shunted across said first resistance including a third variable resistor, a motor-driven potentiometer, and a fourth variable resistor all connected in series, said third and fourth resistors having their control shafts connected together, a potentiometer connected in shunt with said second motor-driven potentiometer, an amplifier, a lead connecting one input terminal of said amplifier to the arm of one motor-driven potentiometer, a cam switch for selectively connecting the other input terminal to said second motor-driven potentiometer or said shunt potentiometer, a cam switch for selectively connecting the amplifier output to the potentiometer motors, a solenoid operated valve for selectively passing a test fluid or a standard fluid to said sample cell, a third cam operated switch for actuating said solenoid, and means for operating said cam switches in timed relation.

7. In a device for measuring the absorption characteristics of a fluid wherein said fluid flows into a chamber irradiated by radiation, a conduit for passing said fluid into said chamber, a vessel containing a liquid, and a branch conduit having one end thereof connected to said fluid conduit and having its other end submerged beneath said liquid, the surface of said liquid having a constant pressure impressed thereon, whereby a constant pressure is maintained in said conduits which is controlled by the depth of liquid in said vessel.

8. In a device for measuring the absorption characteristics of a fluid wherein said fluid flows into a chamber irradiated by infra-red radiation, a conduit for passing said fluid into said chamber, an elongated vessel containing a liquid, a cap sealing the top of said vessel, a branch conduit extending through said cap having one end thereof submerged beneath the liquid in said vessel, the other end of said branch conduit communicating with said fluid conduit, and a pipe passing through said cap communicating with a region of said vessel above the liquid level therein, whereby a constant pressure is maintained in said conduits which is controlled by the depth of liquid in said vessel.

9. In an analyzer, in combination, a pair of bolometers, means for directing beams of radiation upon said bolometers, a sample cell disposed in the path of one of said beams, a radiation-absorbing material in the path of the other beam to absorb radiation of frequencies corresponding to the principal absorption bands of a test component, a balancing resistor connected to one terminal of each bolometer, a resistance interconnecting the other terminals of said bolometers, a second resistance interconnecting said balancing resistors to form a bridge circuit, a motor-driven potentiometer shunted across said second resistance, a motor-driven potentiometer shunted across said first resistance, an amplifier, a lead connecting one input terminal of said amplifier to the arm of one motor-driven potentiometer, means for selectively connecting the other input terminal to the arm of said second motor-driven potentiometer or to a reference point on said first resistance, means for selectively connecting the amplifier output to the potentiometer motors, a valve for selectively passing a test fluid or a standard fluid to the sample cell, and means for operating said valve and said selective connecting means in timed relation to connect the amplifier output to one motor and to connect said other input terminal to said arm when said valve is in position to pass test fluid to the sample cell, and to connect said other input terminal to said reference point when said valve is in position to pass standard fluid to the sample cell, said selective connecting means connecting the amplifier output to the other motor when said valve is in the last named position, so that said first motor driven potentiometer is actuated to balance the bridge circuit while test fluid is passed through the sample cell, and said second motor driven potentiometer is periodically adjusted to balance the bridge circuit while standard fluid is passed through the sample cell.

10. In an analyzer, in combination, a pair of bolometers, means for directing beams of radiation upon said bolometers, a sample cell disposed in the path of one of said beams, a radiation-absorbing material in the path of the other beam to absorb radiation of frequencies corresponding to the principal absorption bands of a test component, a balancing resistor connected to one terminal of each bolometer, a resistance interconnecting the other terminals of said bolometers, a second resistance interconnecting said balancing resistors to form a bridge circuit, a unit shunted across said second resistance including a motor-driven potentiometer, a unit shunted across said first resistance including a second motor-driven potentiometer, a potentiometer connected in shunt with said second motor-driven potentiometer, an amplifier, means connecting one input terminal of said amplifier to the arm of one motor-driven potentiometer, a switch for selectively connecting the other input terminal to said second motor-driven potentiometer or to said shunt potentiometer, a switch for selectively connecting the amplifier output to the potentiometer motors, means for selectively passing a test fluid or a standard fluid to said sample cell, and means for operating said switches in timed relation so that said second motor-driven potentiometer is periodically adjusted to balance the bridge circuit and compensate for changes in the circuit components of the bridge resulting from temperature variations while standard fluid is passed through the sample cell, and said first motor-driven potentiometer is actuated to balance the bridge circuit while test fluid is passed through the sample cell.

11. In an analyzer, in combination, a pair of bolometers, means for directing beams of radiation upon said bolometers, a sample cell disposed in the path of one of said beams, a radiation-absorbing material in the path of the other beam to absorb radiation of frequencies corresponding to the principal absorption bands of a test component, a balancing resistor connected to one terminal of each bolometer, a resistance interconnecting the other terminals of said bolometers, a second resistance interconnecting said balancing resistors to form a bridge circuit, a unit shunted across said second resistance including a variable resistor, a motor-driven potentiometer, and a second variable resistor all connected in series, said variable resistors being ganged so that rotation of their control shaft increases the ohmic value of one variable resistor and decreases the ohmic value of the other variable resistor, a unit shunted across said first resistance including a third variable resistor, a motor-driven potentiometer, and a fourth variable resistor all connected in series, said third and fourth resistors having their control shafts connected together, a potentiometer connected in shunt with said second motor-driven potentiometer, an amplifier, a lead connecting one input terminal of said amplifier to the arm of one motor-driven potentiometer, a cam switch for selectively connecting the other input terminal to said second motor-driven potentiometer or said shunt potentiometer, a cam switch for selectively connecting the amplifier output to the potentiometer motors, a valve for selectively passing a test fluid or a standard fluid to said sample cell, a third cam operated switch for actuating said valve, and means for operating said cam switches in timed relation.

JOSEPH W. HUTCHINS.

REFERENCES CITED

The following references are of record in the file of this patent:

UNITED STATES PATENTS

| Number | Name | Date |
|---|---|---|
| 2,200,254 | Bender | May 14, 1940 |
| 2,395,489 | Major et al. | Feb. 26, 1946 |
| 2,431,899 | Wolf et al. | Dec. 2, 1947 |
| 2,437,935 | Brunner et al. | Mar. 16, 1948 |